United States Patent

Toyama

Patent Number: 5,469,007
Date of Patent: Nov. 21, 1995

[54] MAGNETIC BEARING ARRANGEMENT

[75] Inventor: Katsuhisa Toyama, Hiroshima, Japan

[73] Assignee: Mitsubishi Jukogyo Kabushiki Kaisha, Tokyo, Japan

[21] Appl. No.: 162,322

[22] Filed: Dec. 7, 1993

[51] Int. Cl.$^6$ .............................. H02K 5/24; G05B 11/32
[52] U.S. Cl. ........................................ 310/90.5; 310/68 B
[58] Field of Search ................................ 310/68 B, 68 R, 310/90.5; 318/647, 648, 127, 128

[56] References Cited

U.S. PATENT DOCUMENTS

| | | | |
|---|---|---|---|
| 5,013,987 | 5/1991 | Wakui | 318/632 |
| 5,027,280 | 6/1991 | Ando et al. | 364/474.16 |
| 5,032,751 | 7/1991 | Morita | 310/90.5 |
| 5,104,284 | 4/1992 | Hustak, Jr. et al. | 415/105 |
| 5,140,209 | 8/1992 | Whorlow | 310/90.5 |
| 5,193,953 | 3/1993 | Jesinger | 409/231 |

FOREIGN PATENT DOCUMENTS 5-6418  2/1993  Japan.

*Primary Examiner*—Steven L. Stephan
*Assistant Examiner*—D. R. Haszko
*Attorney, Agent, or Firm*—Wenderoth, Lind & Ponack

[57] ABSTRACT

The present invention is intended to improve the mass-productivity of equipment having magnetic bearings at the time of its manufacture, and to facilitate after-sale service of equipment having magnetic bearings after the time when either of a magnetic bearing control apparatus and a structure having a rotor has gotten out of order and is exchanged or repairs. In the magnetic bearing arrangement according to the present invention, due to the fact that a portion (a central position (off-set) regulator 8, a positional feedback gain adjuster 9 and a filter 10) of control elements of a magnetic bearing control apparatus 1 is placed outside the magnetic bearing control apparatus 1 as such, for instance, inside the structure having the magnetic bearing, some factors restricting the interchangeability between the magnetic bearing control apparatus 1 and a structure (such as a casing) 2 having a rotor are eliminated. It thereby becomes possible to produce the magnetic bearing arrangement and the structure 2 having the rotor separately, and the mass-productivity of equipment having magnetic bearings at the time of its manufacture can therefore be improved. Furthermore, the after-sale service of equipment having magnetic bearings after the time when either of the magnetic bearing control apparatus 1 and the structure 2 having the rotor has gotten out of order and is exchanged or repaired, can be facilitated.

7 Claims, 4 Drawing Sheets

MAGNETIC BEARING ARRANGEMENT

BACKGROUND OF THE INVENTION

1. Field of the Invention

The present invention relates to a magnetic bearing arrangement which is applied to a floating object, for example, a high-speed rotor such as a spindle for a turbo-molecular pump, compressor, turbine or machine tool.

2. Description of the Prior Art

As a means for holding a high-speed rotor as a floating object in a floating condition there is known a magnetic bearing making use of electromagnets. Referring now to FIG. 5, such a magnetic bearing of the prior art will be described. Reference numeral 4 designates a rotor, numerals 5a and 5b designate a pair of magnetic bearings (journal bearings) for rotatably supporting the rotor 4, and numerals 6a and 6b each designates a position sensor for detecting the floating position of the rotor 4.

The amperage of the electric current to be passed through electromagnets (not shown) provided on the magnetic bearings 5a and 5b is determined on the basis of a detection signal obtained by the floating position of the rotor 4 being detected by the position sensors 6a and 6b, thereby controlling the magnitude of the magnetic force generated in the electromagnets so that the floating position of the rotor 4 is set.

FIG. 6 is a block diagram of a control apparatus for the aforementioned magnetic bearings. In FIG. 6, reference numeral 1 designates a magnetic bearing control apparatus, numeral 2 designates a structure (such as a casing) having a rotor, numeral 3 designates a portion in which interchangeability is restricted, numeral 7 designates a position sensor, numeral 8 designates a central position (off-set) regulator, numeral 9 designates a positional feedback gain adjuster, numeral 10 designates a control circuit tuned to the natural frequency of the rotor 4, which is hereinafter called "a filter", numeral 11 designates another control circuit, and numeral 12 designates an electromagnet.

The central position (off-set) regulator 8 serves to electrically correct and adjust mechanical dislocation in the floating and holding center of the rotor, and depends upon error in assembly that occurred at the time of placing the position sensor 7. It is to be understood that the adjustment value thereof will vary for each piece of equipment having magnetic bearings.

The positional feedback gain adjuster 9 serves to convert the output voltage of the position sensor 7 into a displacement of the rotor 4 from its floating center, and it further includes an operation of correcting the sensitivity of the position sensor 7 that differs at its respective points.

The filter 10 serves to damp a high frequency hunting (natural vibration of rotor bending mode) which is generated because of a lower damping capacity based on a high gain and phase lag of a magnetic bearing in its high frequency region, thereby ensuring the rotative stability thereof. It is also to be understood that the set value of the central frequency of this filter 10 will vary for each piece of equipments having magnetic bearings in order to fit with the natural frequency of the rotor 4.

The control circuit 11 is generally composed of a proportioning element, an integrating element and a differentiating element (PID element) in order that a positional control for a deviation of the rotor 4 from its floating center and a gain and phase designed to damp the oscillation of the rotor 4 having a natural value of rigid body mode can be ensured.

The central position (off-set) regulator 8, positional feedback gain adjuster 9, filter 10 and control circuit 11 are usually incorporated in the magnetic bearing control apparatus 1, while the position sensor 7 and electromagnet 12 are incorporated in the structure 2 having the rotor.

In the aforementioned prior art, there are the following problems to be solved.

(1) In general, equipment having magnetic bearings comprises two units of a structure having a rotor and a magnetic bearing control apparatus for controlling the rotor as it is floated. Of course this magnetic bearing control apparatus includes an inverter for high-speed rotation of the rotor.

The aforementioned two units are connected with each other by means of a magnetic bearing controlling cable and a motor driving cable.

(2) The magnetic bearing control apparatus includes portions which are regulated or set depending on the properties of the structure having the rotor. For example, the central position (off-set) regulator 8 for correcting a mechanical dislocation in the floating center of the rotor, depending upon error in assembly occurring at the time of placing the position sensor 7, the positional feedback gain adjuster 9 for converting the output voltage of the position sensor 7 into a deviation of the rotor from its floating center, and the filter 10 for damping the oscillation of the rotor having a primary natural value of bending mode, correspond to these portions.

Adjustment values and set values in these portions which are regulated or set depending on the properties of the structure will vary on each of the structures having the rotor. Therefore, the magnetic bearing control apparatus and the structure having the rotor make a one-to-one combination.

(3) If this one-to-one combination which the magnetic bearing control apparatus and the structure having the rotor make is changed, normal function would be lost in the control of the magnetic bearing, and as a result its stable rotation could not be ensured.

(4) The fact that this one-to-one combination can not be modified, i.e. the fact that there is no interchangeability between the magnetic bearing control apparatus and the structure having the rotor, reduces remarkably the mass-productivity of equipment having magnetic bearings. Furthermore, this fact is undesirable for managing such equipment in after-sale service or for taking countermeasures to some problems.

SUMMARY OF THE INVENTION

Due to consideration of the aforementioned problems, the present invention has been proposed. It is an object of the present invention to provide a magnetic bearing arrangement in which the mass-productivity of equipment having magnetic bearings at the time of its manufacture can be improved, and in which the after-sale service of equipment having magnetic bearings after the time when either of a magnetic bearing control apparatus and a structure having a rotor, which has gotten out of order, is exchanged or repaired, can be facilitated.

In order to achieve the aforementioned purpose according to the present invention, there is provided a magnetic bearing arrangement comprising a structure having a magnetic bearing in which a detection signal from a position sensor for detecting the floating position of a floating object to be held is fed backward, thereby controlling a magnetic force, and a floating object is held by virtue of this magnetic force. A magnetic bearing control apparatus is provided constructed so that the detection signal from the position sensor is fed backward after it is subjected to a central position regulation and a positional feedback gain adjustment and passed through a control circuit tuned to a natural frequency of the floating object. A portion including at least a central position regulator, a positional feedback gain adjuster and the control circuit tuned to the natural frequency, among control elements in the magnetic bearing control apparatus, which should be regulated inherently in the floating object, is placed outside the magnetic bearing control apparatus. The placing position of the portion outside the magnetic bearing control apparatus may be inside the structure having the magnetic bearing.

In the magnetic bearing arrangement according to the present invention, due to the fact that a portion of the control elements in the magnetic bearing control apparatus is placed outside the magnetic bearing control apparatus, for instance, inside a structure having a magnetic bearing, as mentioned above, some factors of restricting the interchangeability between the magnetic bearing control apparatus and the structure having a rotor that is the floating object are eliminated. It thereby becomes possible to produce the magnetic bearing arrangement and the structure (such as a casing) having the rotor separately, and the mass-productivity of equipment having magnetic bearings at the time of its manufacture can therefore be improved. Furthermore, the after-sale service of equipment having magnetic bearings after the time when either of the magnetic bearing control apparatus and the structure having the rotor, which has gotten out of order, is exchanged or repaired, can be facilitated.

BRIEF DESCRIPTION OF THE DRAWINGS

The above-mentioned and other objects, features and advantages of the present invention will become more apparent by reference to the following description of preferred embodiments of the invention taken in conjunction with the accompanying drawings.

In the accompanying drawings.

DETAILED DESCRIPTION OF THE INVENTION

First Preferred Embodiment

Figure 1:
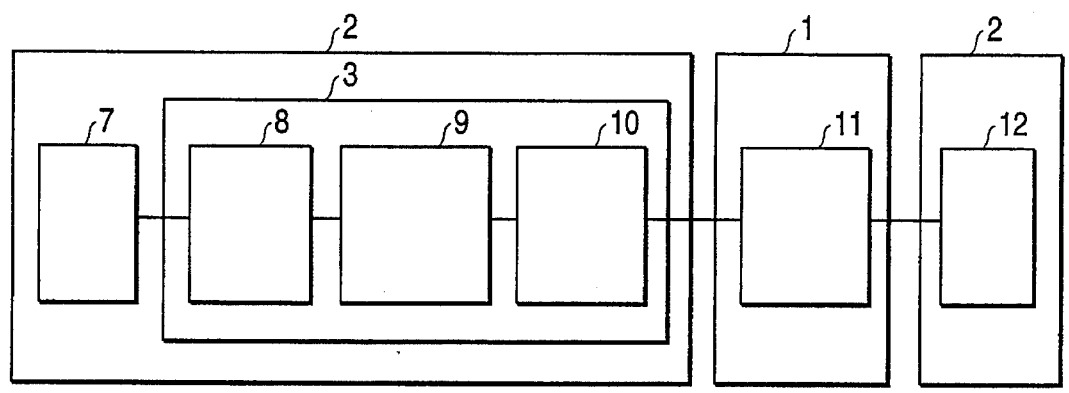
FIG. 1 is a block diagram showing a firs preferred embodiment of the magnetic bearing arrangement according to the present invention.

A magnetic bearing arrangement according to the present invention will be described in connection with a first preferred embodiment illustrated in FIGS. 1 and 2. In FIG. 1, reference numeral 1 designates a magnetic bearing control apparatus, numeral 2 designates a structure (such as a casing) having a rotor, numeral 3 designates a portion in which interchangeability is restricted, numeral 7 designates a position sensor, numeral 8 designates a central position (off-set) regulator, numeral 9 designates a positional feedback gain adjuster, numeral 10 designates a control circuit tuned to a natural frequency of a rotor, which is hereinafter called "a filter", numeral 11 designates another control circuit, and numeral 12 designates an electromagnet. The same FIG. 1 shows a block diagram in the case where the portion 3, in which the interchangeability is restricted, is incorporated in the structure (such as a casing) 2 having the rotor.

Figure 2:
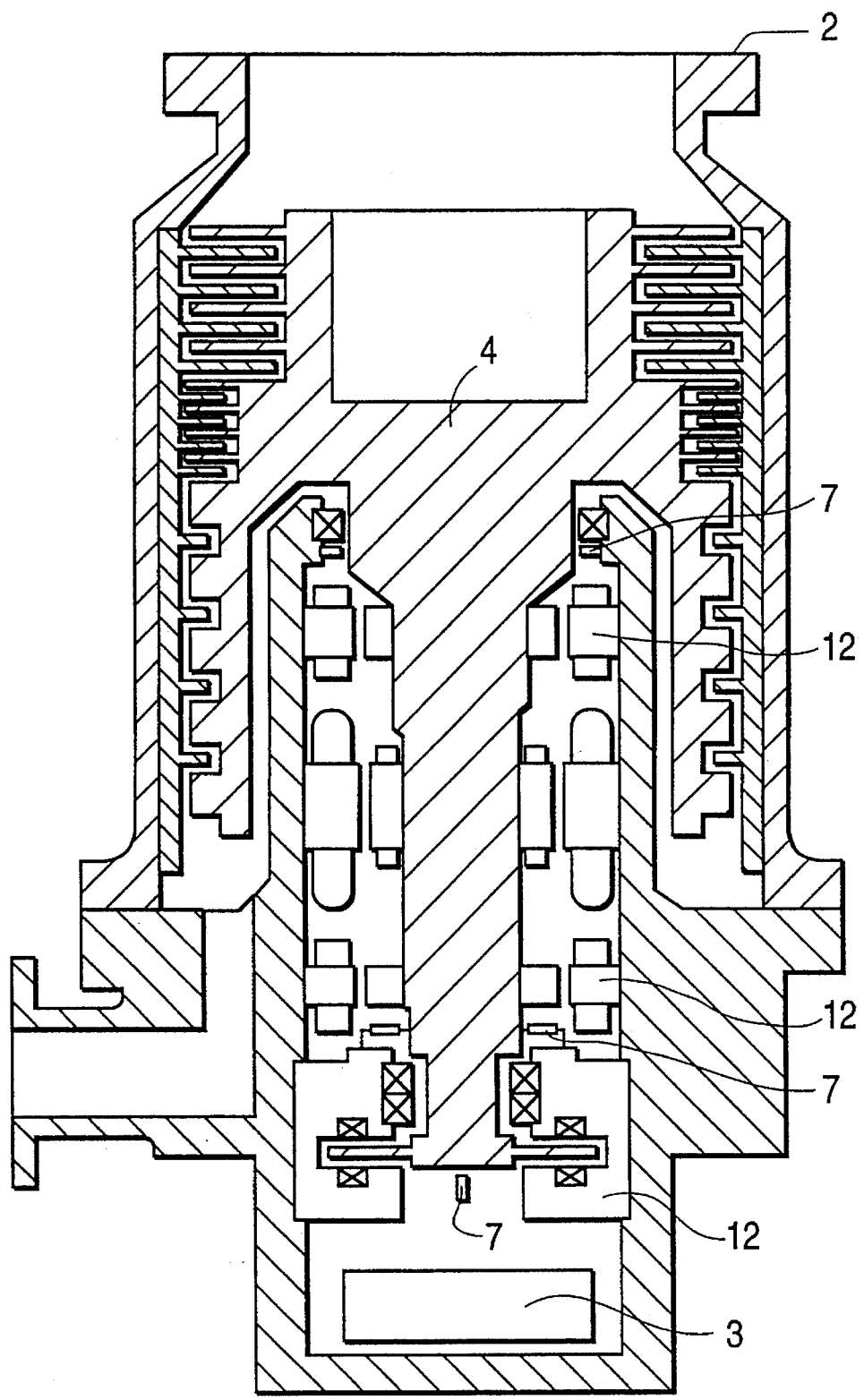
FIG. 2 is a vertical cross-sectional view of the same magnetic bearing arrangement applied to a turbomolecular pump.

FIG. 2 shows an example of the same magnetic bearing arrangement applied to a turbomolecular pump. The output of the position sensor 7 is regulated by means of the central position (off-set) regulator (a central position regulator for correcting a dislocation in the axial central position of a rotor 4 caused by placing the position sensor 7) 8 and the feedback gain adjuster 9 for correcting a varying output value which the position sensor 7 has by itself. This regulated output is passed through the filter 10, which is tuned to the natural frequency of the rotor 4. Then a magnetic force of the electromagnet 12 is controlled by the control circuit 11 for effecting PID and phase compensation and the rotor 4 is held floated or suspended by virtue of the same magnetic force.

The portion 3 which is regulated or adjusted, depending on the features of the main body of this turbomolecular pump, and in which the interchangeability is restricted, this is a portion including the central position (off-set) regulator 8, feedback gain adjuster 9 and filter 10, and is incorporated as one unit in the main body of the same turbomolecular pump.

Second Preferred Embodiment

Figure 3:
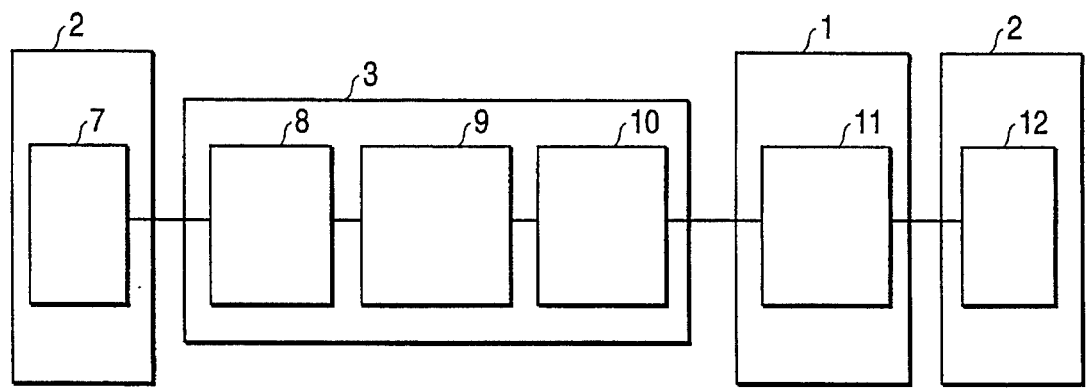
FIG. 3 is a block diagram showing a second preferred embodiment of the magnetic bearing arrangement according to the present invention.

A magnetic bearing arrangement according to the present invention will be further described in connection with a second preferred embodiment illustrated in FIGS. 3 and 4. In FIG. 3, reference numeral 1 designates a magnetic bearing control apparatus, numeral 2 designates a structure (such as a casing) having a rotor, numeral 3 designates a portion, in which interchangeability is restricted, numeral 7 designates a position sensor, numeral 8 designates a central position (off-set) regulator, numeral 9 designates a positional feedback gain adjuster, numeral 10 designates a filter, numeral 11 designates another control circuit, and numeral 12 designates an electromagnet. FIG. 3 shows a block diagram in a case where the portion 3, in which interchangeability is restricted, is placed as one unit outside the structure (such as the casing) 2 housing the rotor separately from the magnetic bearing control apparatus 1.

Figure 4:
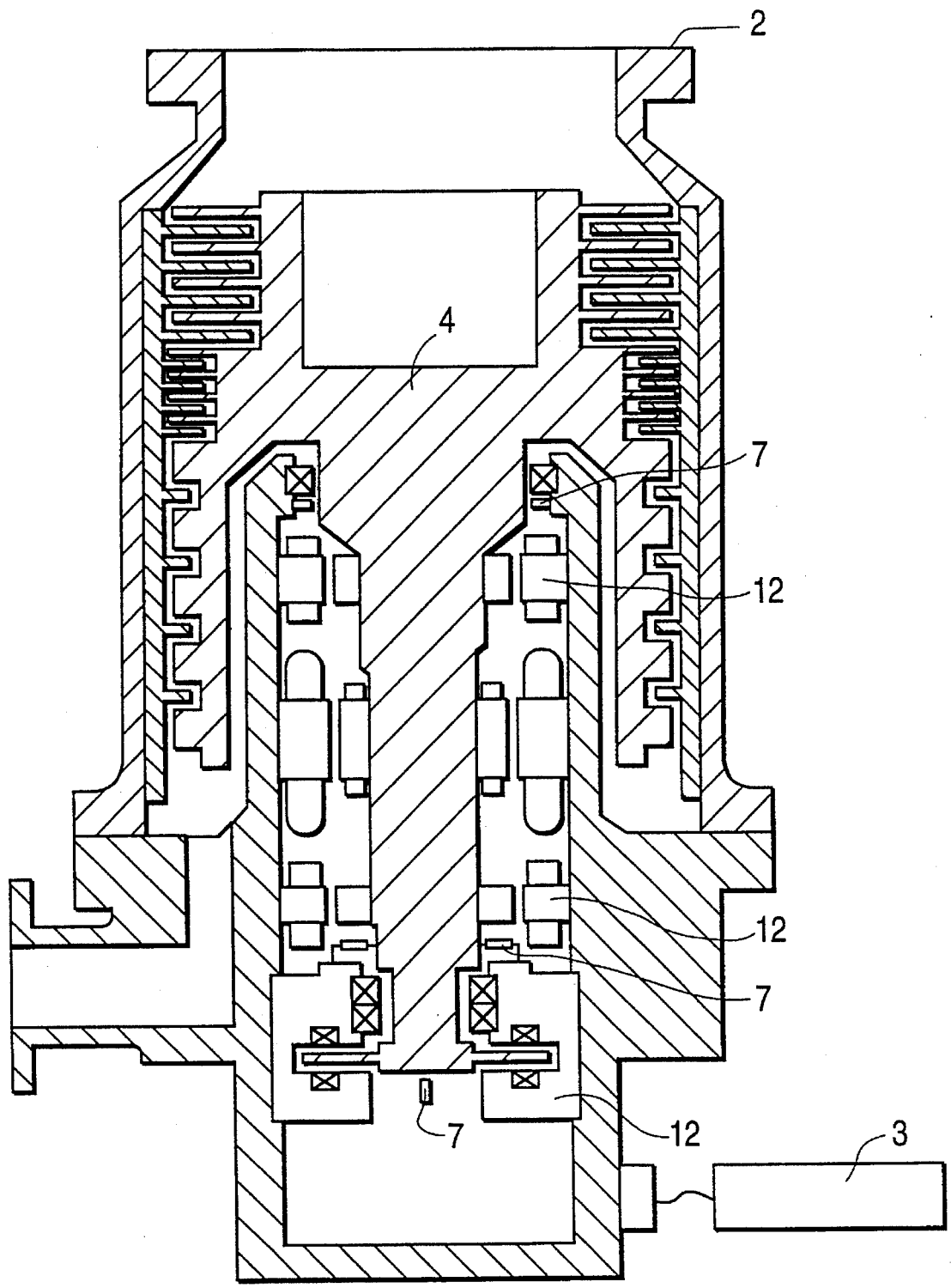
FIG. 4 is a vertical cross-sectional view of the same magnetic bearing arrangement applied to a turbomolecular pump.
Figure 5:
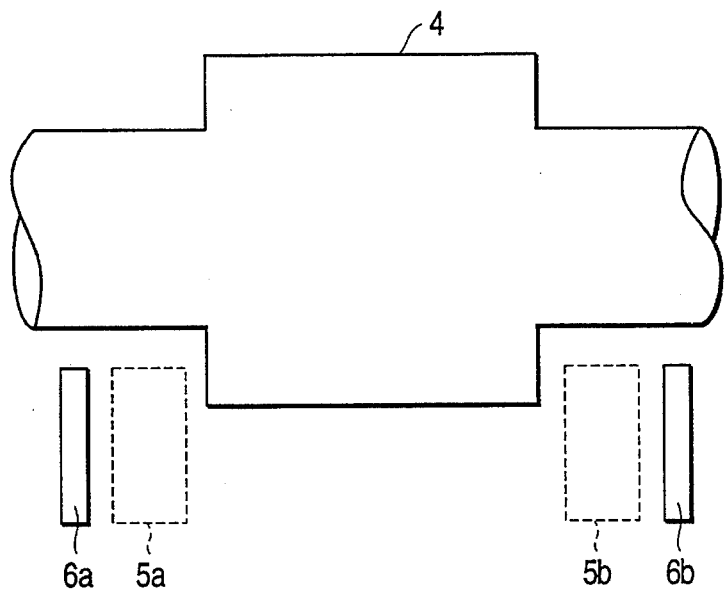
FIG. 5 is a side view showing a magnetic bearing arrangement of the prior art.
Figure 6:
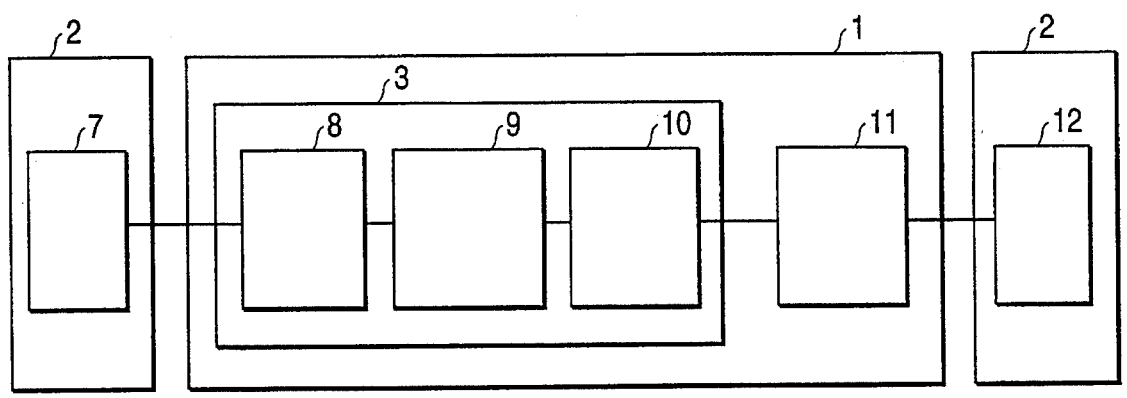
FIG. 6 is a block diagram of the prior art magnetic bearing arrangement.

FIG. 4 shows an example of the same magnetic bearing arrangement applied to a turbomolecular pump. The function thereof is the same as in the case of the turbomolecular pump illustrated in FIG. 2.

Due to the fact that the portion including at least the central position regulator, the positional feedback gain adjuster and the control circuit tuned to the natural frequency, among control elements in the magnetic bearing control apparatus, which is regulated inherently in the floating object, is placed outside the magnetic bearing control apparatus, for instance, inside the structure having the magnetic bearing, as mentioned above, in the magnetic bearing arrangement according to the present invention, some factors of restricting the interchangeability between the magnetic bearing control apparatus and the structure having the rotor that is the floating object are eliminated. It thereby becomes possible to produce the magnetic bearing arrangement and the structure (such as a casing) having the rotor separately, and the mass-productivity of equipment having magnetic bearings at the time of its manufacture can therefore be improved.

Furthermore, the after-sale service of equipment having magnetic bearings after the time when either of the magnetic bearing control apparatus and the structure having the rotor, which has gotten out of order, is exchanged or repaired, can be facilitated.

While the present invention has been described in detail above in connection to the illustrated embodiments, it is a matter of course that the present invention should not be limited only to these embodiments and that many changes and modifications could be made to a configuration and a construction thereof without departing from the scope of the invention as defined in the appended claims.

What is claimed is:

1. A magnetic bearing arrangement, comprising:

a structure having a magnetic bearing for supporting a suspended object with magnetic force;

a position sensor for detecting the suspended position of the suspended object and providing a detection signal in response thereto;

a circuit unit for receiving the detection signal from said position sensor comprising control elements for regulating inherent features of said structure having said magnetic bearing including a central position regulator, a positional feedback gain adjustment and a control circuit tuned to a natural frequency of the suspended object; and a magnetic bearing control apparatus for receiving the detection signal from said circuit unit after the detection signal has been subjected to central position regulation and a positional feedback gain adjustment and passed through said control circuit tuned to a natural frequency of the suspended object and for controlling the magnetic force of said magnetic bearing of said structure;

wherein said circuit unit is provided and located outside of said magnetic bearing control apparatus such that said magnetic bearing control apparatus can be interchanged with respect to said structure having said magnetic bearing independently of said circuit unit.

2. The magnetic bearing arrangement of claim 1, wherein said circuit unit is located outside of said structure.

3. The magnetic bearing arrangement of claim 2, wherein said structure is a casing for housing the object to be suspended and said circuit unit is located outside of said casing.

4. The magnetic bearing arrangement of claim 1, wherein said circuit unit is located inside said structure having said magnetic bearing.

5. The magnetic bearing arrangement of claim 4, wherein said structure comprises a casing for housing the object to be suspended, said position sensor and said circuit unit.

6. The magnetic bearing arrangement of claim 5, wherein said magnetic bearing control apparatus is provided outside of said structure having said magnetic bearing.

7. The magnetic bearing arrangement of claim 1, wherein said magnetic bearing control apparatus is provided outside of said structure having said magnetic bearing.

* * * * *